US010407151B2

(12) United States Patent
Cazals et al.

(10) Patent No.: US 10,407,151 B2
(45) Date of Patent: Sep. 10, 2019

(54) DOORS FOR AN EASY ACCESS TO THE PRESSURIZED HOUSING OF A FLYING WING, FROM THE TRAILING EDGE

(71) Applicant: Airbus Operations SAS, Toulouse (FR)

(72) Inventors: Olivier Cazals, Blagnac (FR); Jaime Genty De La Sagne, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 297 days.

(21) Appl. No.: 15/441,510

(22) Filed: Feb. 24, 2017

(65) Prior Publication Data
US 2017/0247100 A1 Aug. 31, 2017

(30) Foreign Application Priority Data
Feb. 26, 2016 (FR) ...................... 16 51623

(51) Int. Cl.
B64C 1/14 (2006.01)
B64C 39/10 (2006.01)
B64C 1/24 (2006.01)
B64D 27/14 (2006.01)

(52) U.S. Cl.
CPC ............ B64C 1/1423 (2013.01); B64C 1/143 (2013.01); B64C 1/24 (2013.01); B64C 39/10 (2013.01); B64D 27/14 (2013.01); B64C 2039/105 (2013.01); Y02T 50/12 (2013.01)

(58) Field of Classification Search
CPC ........................... B64C 39/10; B64C 2039/105
See application file for complete search history.

(56) References Cited

U.S. PATENT DOCUMENTS

| 2,194,596 | A | * | 3/1940 | Henter | .................... B64C 39/10 114/274 |
| 2,650,780 | A | | 9/1953 | Northrop et al. | |
| 4,176,812 | A | * | 12/1979 | Baker | ................... B64C 1/1407 182/77 |
| 5,149,012 | A | * | 9/1992 | Valverde | ............. B64C 29/0025 244/12.2 |
| 5,823,468 | A | * | 10/1998 | Bothe | ....................... B64B 1/08 244/2 |
| 6,595,466 | B2 | | 7/2003 | Depeige et al. | |

(Continued)

FOREIGN PATENT DOCUMENTS

WO 2007031320 3/2007

OTHER PUBLICATIONS

French Search Report, dated Nov. 4, 2016, priority document.

Primary Examiner — Joseph W Sanderson
(74) Attorney, Agent, or Firm — Greer, Burns & Crain, Ltd.

(57) ABSTRACT

An aircraft of flying wing or blended wing body type comprising, for access to a pressurized housing, a non-pressurized door in the trailing edge of the aircraft and a pressurized door on the pressurized housing. The distance between the center of the pressurized door and a plane of symmetry of the aircraft is less than or equal to the distance between the center of the non-pressurized door and the plane of symmetry, and the pressurized door is located on a wall other than a rear wall of the pressurized housing or upstream of a rear extremum point of the housing in the absence of any such rear wall.

9 Claims, 4 Drawing Sheets

(56) References Cited

U.S. PATENT DOCUMENTS

| | | | | |
|---|---|---|---|---|
| 6,666,406 B2* | 12/2003 | Sankrithi | ................ | B64C 39/04 |
| | | | | 244/119 |
| 6,866,225 B2* | 3/2005 | Jones | .................... | A61M 21/02 |
| | | | | 244/118.5 |
| 7,093,798 B2* | 8/2006 | Whelan | ................. | B64C 1/0009 |
| | | | | 244/120 |
| 8,113,464 B2* | 2/2012 | Cazals | ...................... | B64C 1/22 |
| | | | | 244/118.1 |
| 8,366,050 B2* | 2/2013 | Odle | .................... | B64C 1/1415 |
| | | | | 244/119 |
| 8,459,594 B2* | 6/2013 | Anger | .................... | B64C 39/10 |
| | | | | 244/118.5 |
| 9,611,039 B2* | 4/2017 | Lieven | ...................... | B64C 1/00 |
| 10,167,081 B2* | 1/2019 | Gallant | ................. | B64D 11/00 |
| 2002/0063187 A1* | 5/2002 | Depeige | ................. | B64C 39/02 |
| | | | | 244/137.2 |
| 2010/0243814 A1 | 9/2010 | Anger et al. | | |
| 2011/0226899 A1* | 9/2011 | Cazals | ...................... | B64C 1/22 |
| | | | | 244/118.1 |
| 2014/0175215 A1* | 6/2014 | Gallant | ................. | B64D 11/00 |
| | | | | 244/36 |
| 2014/0319274 A1* | 10/2014 | Lieven | ...................... | B64C 1/00 |
| | | | | 244/118.5 |
| 2017/0183077 A1* | 6/2017 | Cazals | ................. | B64C 1/1415 |
| 2017/0183078 A1* | 6/2017 | Cazals | ................. | B64C 1/1415 |
| 2018/0334254 A1* | 11/2018 | Saint-Marc | ........... | B64C 23/005 |

\* cited by examiner

DOORS FOR AN EASY ACCESS TO THE PRESSURIZED HOUSING OF A FLYING WING, FROM THE TRAILING EDGE

CROSS-REFERENCES TO RELATED APPLICATIONS

This application claims the benefit of the French patent application No. 16 51623 filed on Feb. 26, 2016, the entire disclosures of which are incorporated herein by way of reference.

TECHNICAL FIELD

The invention concerns a particular door arrangement for an aircraft of flying wing or blended wing body type to enable the boarding and exit of passengers and/or emergency evacuation of passengers and/or access to the cargo hold.

BACKGROUND OF THE INVENTION

Various aircraft configurations are known in the prior art.
The invention more particularly concerns configurations of the flying wing or blended wing body type.
An aircraft of the flying wing type has no fuselage.
In a blended wing body aircraft there is no sharp distinction between the fuselage and the wings as in a conventional aircraft. The fuselage and the wings each contribute to the lift of the aircraft. The aircraft features a trailing edge that is continuous between the body and each of the wings.
In both cases the aircraft receives zones dedicated to the transport of passengers (pax) and/or merchandise (cargo).
The location of the doors employed in these configurations stems directly from their placement in a more conventional configuration in which the wings and the fuselage form two clearly distinct elements.
In a conventional configuration, the doors are on the fuselage of the aircraft. In a flying wing or blended wing body type aircraft the doors are therefore on the leading edge, as shown in the document U.S. Pat. No. 6,595,466.
FIG. 1 shows a blended wing body aircraft 100 as described in the above document having a series of doors 11 each of which is on the leading edge.
At this location the doors have a serious impact on the aerodynamics of the flying wing, respectively the blended wing body aircraft, however.
The document U.S. Pat. No. 6,595,466 also describes tunnel structures dedicated to the emergency evacuation of passengers.
The blended wing body aircraft 100 as shown in FIG. 1 includes four structures 12 of this type parallel to the longitudinal axis (Ox) of the aircraft 100 and each of which is at the rear of the aircraft. The structures influence the aerodynamics of the aircraft and are separated, two by two, by ailerons.
In FIG. 1, each structure 12 is connected at the level of the trailing edge of the aircraft to a slide 13 for emergency evacuation of the passengers.
At the other end of the structure 12 a door (not shown) provides access to the passenger compartment. Although away from the leading edge of the aircraft, this door affects the aerodynamics of the aircraft because it implies the presence of the structures 12.
An objective of the present invention is to propose a door configuration for access to a pressurized housing of a flying wing or blended wing body type aircraft that is particularly advantageous from the point of view of the aerodynamics of the aircraft.

SUMMARY OF THE INVENTION

The above objective is achieved with a flying wing or blended wing body type aircraft including at least one pair of doors for access to a pressurized housing of the aircraft, each pair of doors comprising a non-pressurized door in the trailing edge of the aircraft and a pressurized door on the pressurized housing.

According to the invention:
the distance between the geometric center of the pressurized door and a plane of symmetry of the aircraft is less than or equal to the distance between the geometric center of the non-pressurized door and the plane of symmetry; and
the pressurized door is outside a rear wall of the pressurized housing, termed a bulkhead, or upstream of a rear extremum point of the housing in the absence of any such rear wall.

The reader is reminded that the distance between a point (the geometric center of the pressurized door or the geometric center of the non-pressurized door) and a plane (the plane of symmetry of the aircraft) is the shortest distance between the point and the plane.

The non-pressurized door is in the trailing edge of the aircraft, that is to say in a region where any surface defects on the external surface of the aircraft have little influence on the aerodynamics of the aircraft.

Consequently, the aerodynamic performance of the aircraft is not affected by the doors according to the invention.

Access to the pressurized housing is via the pressurized door, which alone is subjected to structural stresses linked to pressurization.

Consequently, the non-pressurized door forming part of the external surface of the aircraft can have an optimum shape for the aerodynamics of the aircraft without this implying any particular technical difficulty.

The effect of the features concerning the relative disposition of the pressurized door and the non-pressurized door and their disposition relative to the pressurized housing is that the non-pressurized door is outside a central zone of the trailing edge of the aircraft.

The presence of the non-pressurized doors in the trailing edge of the aircraft may call for the elimination or relocation of control surfaces, if any. However, these control surfaces, if any, are relatively inefficient, the most effective control surfaces being situated in the central zone, where they profit from a high lever arm favorable to the handling of the aircraft.

In other words, the positioning of the doors according to the invention makes it possible to leave free a central zone of the trailing edge, at the rear of the aircraft, for control surfaces or flaps that in this region benefit from a high lever arm. This high lever arm is favorable to the handling of the aircraft.

Another effect of the features concerning the relative disposition of the pressurized door and the non-pressurized door and their disposition relative to the pressurized housing is that an aisle extending inside the aircraft between these doors extends parallel to the plane of symmetry of the aircraft or departs from the plane of symmetry in the direction toward the exterior of the aircraft.

This disposition of the aisle enables particularly fluid circulation for access to or exit from the pressurized housing, that housing receiving a passenger compartment or a cargo hold, for example. This fluid circulation is particularly important in an emergency evacuation situation. It is also of benefit under normal boarding or disembarkation conditions by contributing to limiting the time for which the aircraft is immobilized on the ground.

The doors according to the invention are therefore particularly advantageous from the point of view of the layout of the pressurized housing and from the point of view of the overall architecture of the rear part of the aircraft, as well as minimizing any aerodynamic penalty inherent to the presence of a door.

According to one advantageous embodiment, the aircraft according to the invention includes at least two turbine engines disposed at the rear of the aircraft and the non-pressurized door is in the trailing edge outside a region of the trailing edge delimited by the engines of the at least two engines that are the farthest apart.

When the non-pressurized door is closed, each of its lateral edges is preferably in a vertical plane inclined relative to the plane of symmetry of the aircraft.

The pressurized door can be in a plane parallel to the plane of symmetry of the aircraft.

The non-pressurized door preferably has an external surface with no discontinuity of slope relative to the external surface of the rest of the aircraft.

The non-pressurized door can be an integral part of an external profile of the aircraft.

According to one advantageous embodiment, the non-pressurized door comprises an upper part and a lower part that are mounted to pivot toward the exterior of the aircraft, the upper part being mounted to pivot on rotation means that extend along the upper edge of the door and the lower part being mounted to pivot on rotation means that extend along the lower edge of the door.

The non-pressurized door can be equipped with folding stairs mounted on and attached to the lower part of the door, the stairs including folding steps connected to means for folding and deploying the steps to transform the stairs into a ramp and vice versa.

Lateral walls are preferably mounted on and attached to the upper part of the non-pressurized door and are inside the aircraft when the non-pressurized door is closed and outside the aircraft between the upper part and the external surface of the rest of the aircraft when the non-pressurized door is open.

BRIEF DESCRIPTION OF THE DRAWINGS

The present invention will be better understood on reading the description of embodiments given by way of non-limiting example only and with reference to the appended drawings, in which.

DETAILED DESCRIPTION OF THE PREFERRED EMBODIMENTS

In all the figures, the views are positioned relative to an orthonormal coordinate system defined by three axes (Ox), (Oy) (Oz) in which:

the axis (Ox) corresponds to the longitudinal axis of the aircraft; it is parallel to a plane AA' of symmetry of the aircraft; it is oriented from a rear region of the aircraft to a front region of the aircraft, where the front and the rear of the aircraft are referenced to the direction of movement of the aircraft under normal flight conditions;

the axis (Oy) corresponds to the transverse axis of the aircraft perpendicular to the axis (Ox); and the axis (Oz) corresponds to the height axis of the aircraft perpendicular to the plane (Oxy).

Figure 1:
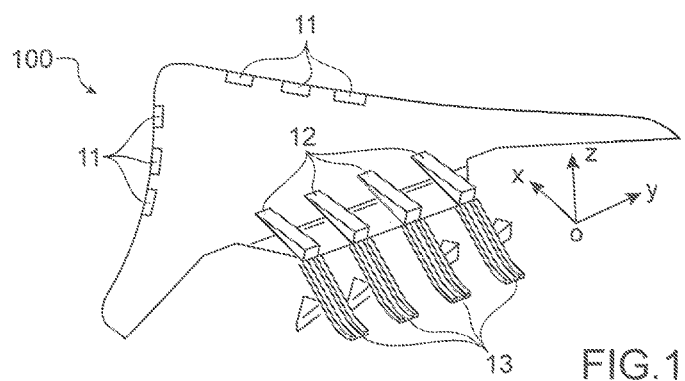
FIG. 1 is a perspective view of an example of a prior art blended wing body aircraft.
Figure 2A:
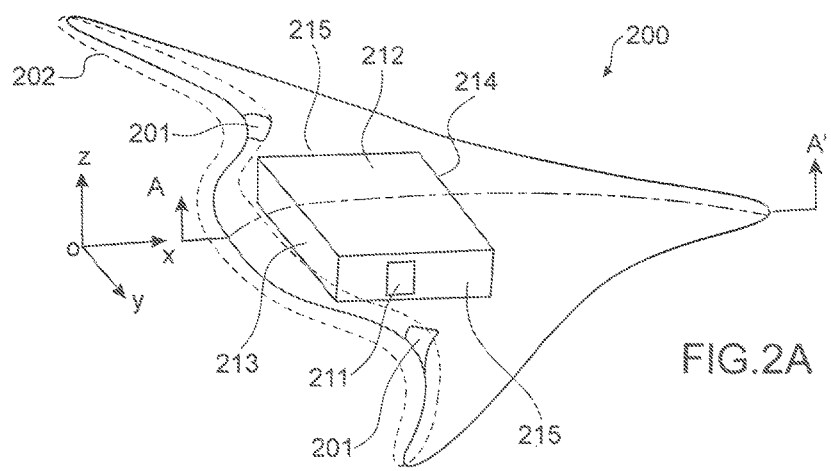
FIGS. 2A and 2B show an arrangement of doors according to a first embodiment of the invention with the aid of a diagrammatic perspective view and a diagrammatic top view of a blended wing body aircraft.
Figure 2B:
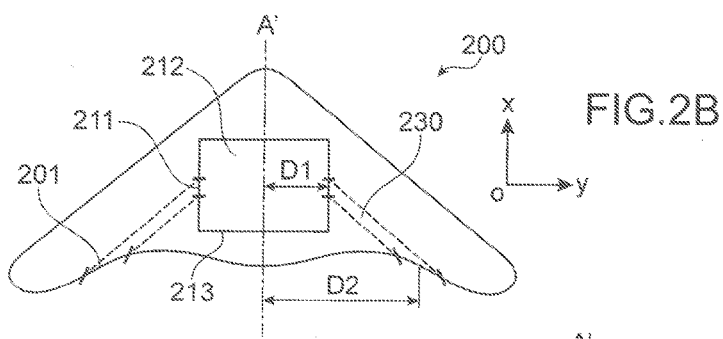

FIGS. 2A and 2B show diagrammatically an arrangement of doors according to the invention in a blended wing body aircraft 200 shown in perspective in FIG. 2A and from above in FIG. 2B.

The aircraft includes pairs of doors including a non-pressurized door 201 in the trailing edge 202 of the aircraft and a pressurized door 211 on the pressurized housing 212 of the aircraft.

The aircraft preferably includes an even number of such pairs distributed symmetrically on either side of its plane AA' of symmetry.

The intersection between the aircraft and its plane AA' of symmetry is represented in chain-dotted line. The plane AA' of symmetry is a plane parallel to the plane (Oxz) passing through the middle of the aircraft along the axis (Oy).

The trailing edge 202 is the rear part of the aircraft 200 referenced to the direction of the airflow when the aircraft is in flight. It corresponds to a zone in which the intrados and extrados airflows meet and it preferably has a thin shape to reduce aerodynamic drag.

In this region, the boundary layer is of maximum thickness with the result that any surface defects introduced by the non-pressurized door 201 have a low impact on the aerodynamics of the aircraft.

In fact, the thickness of the boundary layer increases as the airflow travels over the wet surface toward the rear of the aircraft. The boundary layer is a layer of air contiguous with the external surface of the aircraft in which the accommodation between the zero speed and the local full speed of the air relative to the aircraft occurs. In a flying wing or blended wing body aircraft, particularly high thicknesses of the boundary layer are reached.

Each non-pressurized door 201 forms an integral part of the external profile of the aircraft. It has a shape that is integrated into the aerodynamic profile of the aircraft. This shape is particularly easy to produce because the door 201 is not pressurized. Each door 201 comprises simple fairings with no specific reinforcement.

In FIGS. 2A and 2B, but without this being limiting on the invention, each non-pressurized door 201 is non-plane and there is no discontinuity of slope between the external surface of the non-pressurized door 201 when closed and the external surface of the rest of the aircraft around the non-pressurized door.

In the embodiment shown in these figures the non-pressurized doors 201 are in the trailing edge and more particularly in wing root regions of the blended wing body aircraft.

Each non-pressurized door 201 cooperates with a pressurized door 211 for access to the pressurized housing 212 of the aircraft.

The pressurized housing 212 is the structure inside the aircraft, in which the pressure can be maintained at atmospheric pressure when the aircraft is in flight. The pressurized housing separates, for example, the pressurized passenger compartment from a non-pressurized region, located inside the aircraft between that compartment and the external surface of the aircraft. In addition to this or instead of this, the pressurized housing separates the pressurized cargo hold from a non-pressurized region, located inside the aircraft between the cargo hold and the external surface of the aircraft.

Thus a first door 201 providing access to the exterior of the aircraft is not pressurized, which makes it possible for it to have an aerodynamic profile without this implying any particular technical difficulty.

A second door 211 provides access to the pressurized housing 212. This second door does not need to have an aerodynamic external surface because it is inside the aircraft and not in contact with the airflow. It therefore has limited production constraints, allowing it to be pressurized without this implying any particular technical difficulty.

Here the pressurized housing 212 has a rectangular parallelepiped shape with a rear wall 213 parallel to the plane (Oyz), a front wall 214 parallel to the plane (Oyz) and two side walls 215 each on one side of the plane AA' of symmetry.

The terms "front" and "rear" are referenced to the orientation of the axis (Ox) defined in the introduction.

A person skilled in the specialized aeronautical art may refer to the rear wall 213 as a "bulkhead." This is the rearmost wall of the pressurized housing along the axis (Ox) and the external surface of which includes a discontinuity of slope with the external surface of the side walls 215 of the housing 212.

A discontinuity of slope is a step change in the slope value of these external surfaces. The rear wall 213 and a side wall 215 can each form a plane wall inclined relative to one another, for example at an angle greater than 15°.

In the example shown in FIGS. 2A and 2B, each pressurized door 211 is outside the rear wall 213 on a side wall 215.

Each side wall 215 is in a plane parallel to the plane AA' of symmetry, in a vertical rib forming part of the primary structure of the aircraft, termed a main rib.

D1 (see FIG. 2B) denotes the (shortest) distance between the plane AA' of symmetry and the geometric center of the pressurized door 211.

D2 (see FIG. 2B) denotes the (shortest) distance between the plane AA' of symmetry and the geometric center of the non-pressurized door 201.

The geometric center is, for example, the point at which the diagonals of a rectangle cross.

The geometric center of the pressurized, and respectively, non-pressurized door is a point on the door.

It may, for example, be defined as being the center of gravity of a door of constant thickness and density in space, the external surface of which corresponds to that of the door flattened out to lie in a plane.

In the embodiment of FIGS. 2A and 2B the distance D1 is strictly less than the distance D2.

Consequently, an aisle 230 extending inside the aircraft between the pressurized door 211 and the corresponding non-pressurized door 201 is oriented to depart from the plane AA' of symmetry of the aircraft in the direction toward the rear of the aircraft. This orientation makes possible fluid circulation inside and above all outside the aircraft when boarding or disembarking passengers and/or when boarding and disembarking equipment.

Each door 201, 211 preferably has a minimum clearance width but sufficient to allow entry and exit of a passenger (or a member of the aircrew or ground staff).

Each pressurized door 211 and the corresponding non-pressurized door 201 are advantageously connected to the same door opening and closing control device so that these two doors are opened or closed together.

Figure 3:
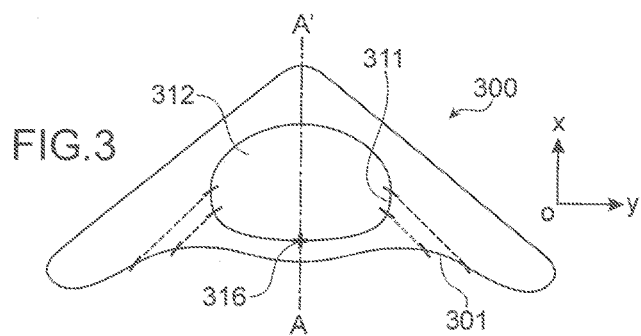
FIG. 3 shows an arrangement of doors according to a second embodiment of the invention in a diagrammatic top view of a blended wing body aircraft.

FIG. 3 shows diagrammatically a second embodiment of an arrangement of doors according to the invention.

The FIG. 3 embodiment will be described only in terms of its differences relative to the embodiment of FIGS. 2A and 2B.

In this second embodiment, the pressurized housing 312 does not have a rectangular parallelepiped shape.

In section in a plane parallel to the plane (Oxy) it has a rounded shape, in particular on the side at the rear of the aircraft.

In particular, the value of the slope of the external surface of the housing varies continuously from a region at the rear of the aircraft to a central region of the aircraft. For example, a section of the housing in a plane parallel to the plane (Oxy) has a circular arc shape.

In this case, it is not possible to define in the pressurized housing 312 a rear wall distinct from side walls.

Each pressurized door 311 is then simply positioned on the upstream side of a rear extremum point 316 on the pressurized housing 312. In other words, a point is defined on the pressurized housing 312, the most at the rear of the aircraft along the axis (Ox). When closed each pressurized door 311 is on the pressurized housing without passing through this point 316 and forward of that point along the axis (Ox).

The center of each pressurized door and this point 316 are preferably spaced along (Ox) by a distance at least equal to 10% of the total length along (Ox) of the pressurized housing.

The previously mentioned technical effect and advantages are present in this second embodiment.

Figure 4:
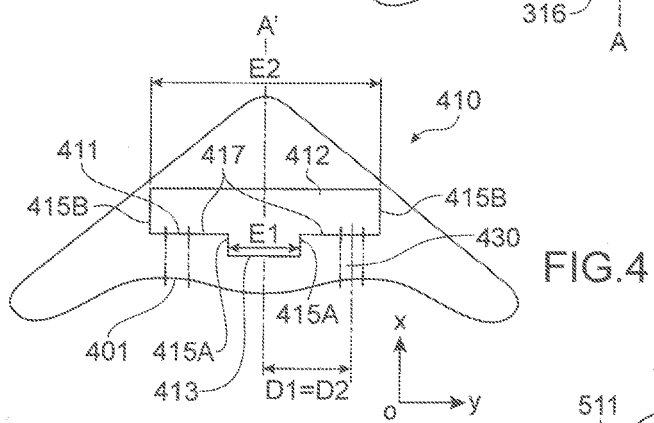
FIG. 4 shows an arrangement of doors according to a third embodiment of the invention in a diagrammatic top view of a blended wing body aircraft.

FIG. 4 shows diagrammatically a third embodiment of an arrangement of doors according to the invention.

The FIG. 4 embodiment will be described only in terms of its differences relative to the embodiment of FIGS. 2A and 2B.

In this third embodiment the pressurized housing 412 does not have a rectangular parallelepiped shape.

It is symmetrical with respect to the plane AA' and comprises a large rectangular parallelepiped at the front and a small rectangular parallelepiped at the rear.

It therefore includes a rear wall 413 parallel to the plane (Oyz) surrounded on either side by two first side walls 415A parallel to the plane (Oxz).

The two first side walls 415A are parallel and spaced by a distance E1 along the axis (Oy).

Then two second side walls 415B are parallel to the plane (Oxz) and spaced along the axis (Oy) by a distance E2 greater than E1.

Each first side wall 415A is connected to a second side wall 415B by a wall 417 parallel to the plane (Oyz).

The walls 417 are therefore parallel to the rear wall 413 but in front of the latter with respect to the axis (Ox).

The walls 417, on the one hand, and the rear wall 413, on the other hand, are preferably parallel and spaced along (Ox) by a distance at least equal to 10% of the total length along (Ox) of the pressurized housing.

According to this third embodiment, each pressurized door 411 is on a wall 417 outside the rear wall 413.

Each pressurized door 411 faces the corresponding non-pressurized door 401.

Accordingly, the distance D1 between the geometric center of the pressurized door 411 and the plane AA' of symmetry is equal to the distance D2 between the geometric center of the non-pressurized door 401 and the plane AA' of symmetry.

These two doors are aligned and can even be parallel to each other.

Consequently, an aisle 430 extending inside the aircraft between each pressurized door 411 and the corresponding non-pressurized door 401, is parallel to the plane AA' of symmetry and outside a central region of the aircraft wider than or the same width as the rear wall 413.

Accordingly, circulation via doors according to the invention on a first side of the rear wall 413 does not impede circulation via doors, according to the invention, on the other side of the rear wall 413 and vice versa.

Circulation inside, and above all outside, the aircraft is therefore fluid when boarding and disembarking passengers and/or boarding and disembarking equipment.

In each of the above embodiments, the non-pressurized doors are at the rear of the aircraft outside a central zone of the trailing edge.

This positioning is particularly advantageous for the handling of the aircraft, as described in detail in the description of the invention.

Figure 5:
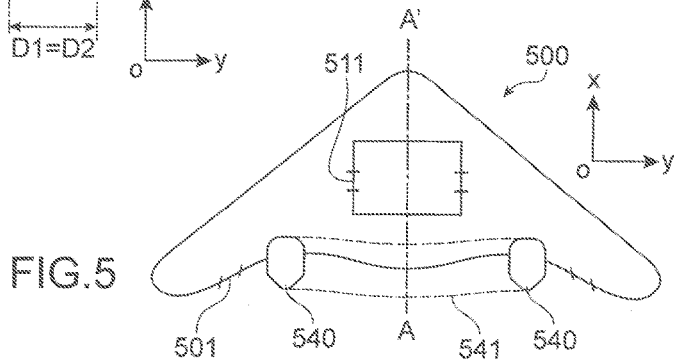
FIG. 5 shows an arrangement of doors according to a fourth embodiment of the invention in a diagrammatic top view of a blended wing body aircraft.

FIG. 5 shows diagrammatically a fourth embodiment of an aircraft according to the invention.

The FIG. 5 embodiment will be described only in terms of its differences relative to the embodiment of FIGS. 2A and 2B.

In this fourth embodiment the engines of the aircraft are at the rear of the aircraft at the level of its trailing edge.

The aircraft in FIG. 5 has in particular two turbine engines 540 (or turbojets engines). These two engines 540 delimit a region 541 of the trailing edge between the engines and including the engines.

Two planes parallel to the plane AA' of symmetry and each tangential to one of the engines are defined. The region 541 is a portion of the trailing edge delimited on each side by these two planes.

The non-pressurized doors 501, according to the invention, are in the trailing edge and outside the region 541.

According to a variant that is not shown, the aircraft has three or more engines. In this case, the region 541 is defined by the two planes farthest apart and each adjacent to one of the engines and parallel to the plane AA' of symmetry.

Figure 6:
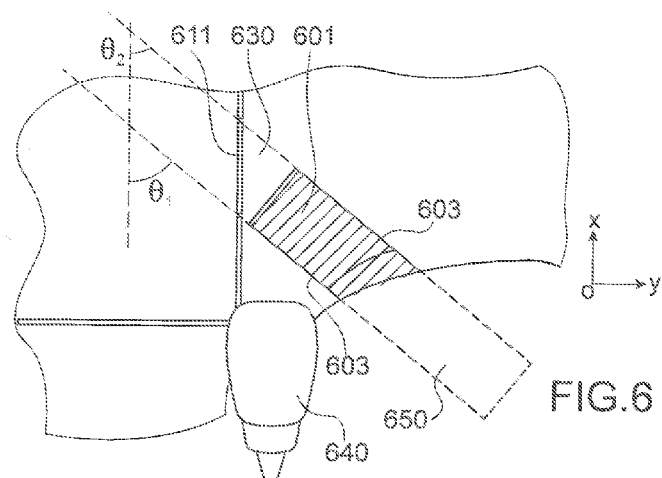
FIG. 6 shows a top view of part of an aircraft according to a fifth embodiment of the invention.

FIG. 6 is a transparent top view showing a part of an aircraft according to a fifth embodiment of the invention. FIG. 6 is centered on one of the assemblies comprising a non-pressurized door 601, here shown cross-hatched, and a pressurized door 611.

The pressurized door 611 opens toward the interior of the cabin, for example, by a movement of rotation about one of its lateral edges parallel to the axis (Oz).

FIG. 6 shows, more particularly, the orientation of each aisle 630 that connects a non-pressurized door 601 and the corresponding pressurized door 611.

Aisles of this kind are symmetrical to one another on either side of the plane of symmetry of the aircraft. In this embodiment the corridor, or aisle, is straight.

Each aisle departs from the plane of symmetry of the aircraft in the direction from the pressurized door 611 to the non-pressurized door 601.

This increasing separation makes it possible for a plurality of pairs of doors, according to the invention, to be used simultaneously while offering maximum fluidity of circulation in the vicinity of the pressurized housing.

In the FIG. 6 embodiment, lateral edges 603 of the non-pressurized door are in vertical planes parallel to the axis (Oz) and inclined to the plane of symmetry of the aircraft.

This inclination is defined in a plane parallel to the plane (Oxy) by an angle $\theta 1$, respectively $\theta 2$, between the left-hand (respectively right-hand) lateral edge and the plane of symmetry of the aircraft.

The two angles $\theta 1$ and $\theta 2$ are preferably equal. They are between 30° and 60° inclusive, for example, or even between 40° and 50° inclusive.

When boarding and disembarking passengers or equipment, access means to the aircraft, such as stairs, preferably extend along an axis parallel to the planes receiving the lateral edges 603 in a zone 650 delimited by dashed lines in FIG. 6. These access means therefore extend slantwise relative to the longitudinal axis of the aircraft, departing from the plane of symmetry of the aircraft in the direction away from the non-pressurized door outside the aircraft.

Two non-pressurized doors situated on either side of the plane of symmetry of the aircraft can be used at the same time without this giving rise to any difficulties linked to the floor space of the means of access to each of these two doors.

Moreover, if necessary, this disposition of the access means makes it possible for passengers entering or exiting the aircraft always to be far away from the air intake and the exhaust of the engines, in an area little affected by the flows of air produced by the engines.

As described in detail hereinafter, these access means may be integrated into the non-pressurized door, in particular, in a lower part or panel thereof.

Figure 7A:
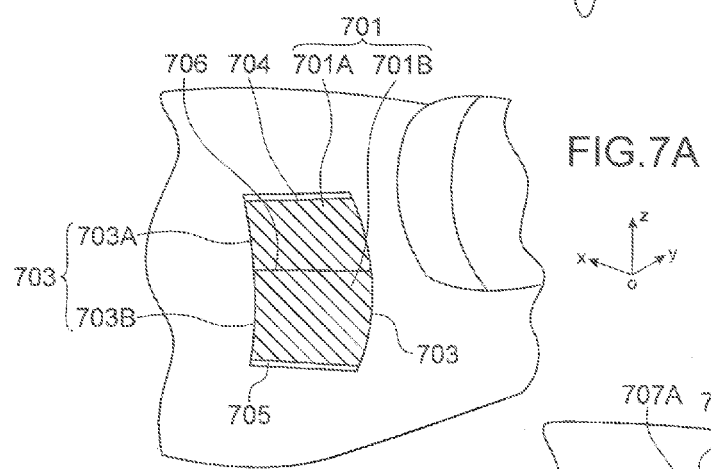
FIGS. 7A and 7B are perspective views of part of an aircraft according to a sixth embodiment of the invention when the non-pressurized door is respectively closed and open.
Figure 7B:
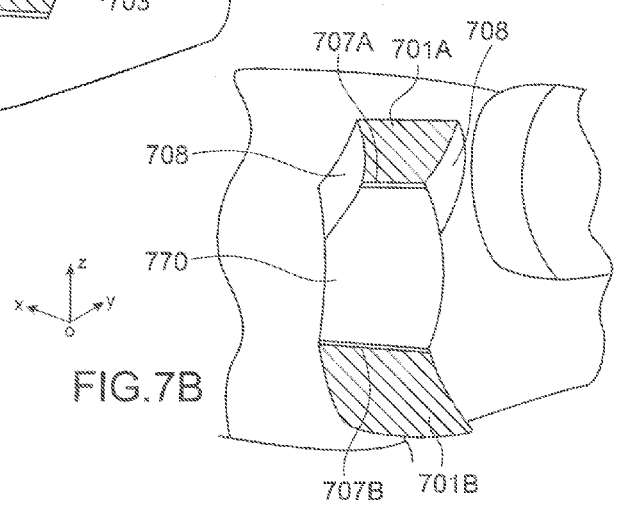

FIGS. 7A and 7B are perspective views of a sixth embodiment of an aircraft according to the invention when the non-pressurized door 701 is open, and respectively, closed.

In FIG. 7A the non-pressurized door 701 is closed.

It is seen that the non-pressurized door 701 comprises an upper part 701A and a lower part 701B. The terms upper and lower are referenced to the axis (Oz) oriented from the ground toward the sky.

The non-pressurized door 701 is delimited by at least four edges or cut-outs: an upper edge 704, a lower edge 705 and two lateral edges 703.

The upper edge 704 is the highest edge of the door 701 along the axis (Oz) when the door 701 is closed. It extends between the two lateral edges 703. Here it is part of the upper part 701A of the door 701.

The lower edge 705 is the lowest edge of the door 701 along the axis (Oz) when the door 701 is closed. It also extends between the two lateral edges 703. Here it is part of the lower part 701B of the door 701.

Each lateral edge 703 comprises a lateral edge 703A of the upper part 701A of the door 701 and a lateral edge 703B of the lower part 701B of the door 701 that are continuous with one another.

The lower part 701B and the upper part 701A of the door meet at the level of a junction 706 that extends between the lateral edges 703.

Here the junction 706 extends along the trailing edge of the aircraft between the parts 701A and 701B of the non-pressurized door 701.

In the example shown in FIG. 7A the lower part 701B and the upper part 701A have substantially the same area.

FIG. 7B shows the door of FIG. 7A, this time open.

When the door 701 opens, each of the upper part 701A and the lower part 701B pivots relative to a door frame. That door frame is attached to the rest of the aircraft and delimits the opening 770 that the non-pressurized door 701 is designed to close.

The upper part 701A, and respectively, lower part 701B, is therefore configured to pivot about a respective rotation axis between a closed position in which it is inside this door frame and an open position in which it is outside this door frame and outside the aircraft.

The kinematics of opening the door are therefore relatively simple, because they comprise two simultaneous rotations. A door of this kind may be referred to as a "crocodile door."

The upper part 701A pivots about a rotation axis located on the side of the upper edge 704 of the non-pressurized door 701. The rotation axis may be parallel to or even coincide with the upper edge 704. The pivoting (or rotation) is achieved for example via a hinge forming upper rotation means 707A that extend along the upper edge 704 of the non-pressurized door 701.

The lower part 701B pivots about a rotation axis located on the side of the lower edge 705 of the non-pressurized door 701. The rotation axis may be parallel to or even coincide with the lower edge 705. The pivoting (or rotation) is achieved for example via a hinge forming lower rotation means 707B that extend along the lower edge 705 of the non-pressurized door 701.

Each rotation axis is advantageously in a plane parallel to the axis (Oz) and inclined with respect to the plane of symmetry of the aircraft at an angle between 30° and 60° inclusive, for example, and even between 40° and 50° inclusive.

FIG. 7B also shows side panels 708 on either side of the upper part 701A of the non-pressurized door and fastened to that upper part 701A.

They are in parallel planes substantially orthogonal to the rotation axis of the upper part 701A.

When the non-pressurized door 701 is closed, the side panels 708 are inside the aircraft.

As the non-pressurized door 701 opens, the side panels 408 slide along the cut-out of the door opening, to appear on the outside of the aircraft on either side of the upper part 701A.

When the non-pressurized door 701 is open, each side panel 708, more particularly, extends between a lateral edge of the upper part 701A of the door 701 and the door frame, in direct physical contact with these two elements.

The side panels 708 thus form flanges or protection panels to protect passengers from the flow of air produced by the engines.

There are side panels 708 only on the upper part 701A of the non-pressurized door 701.

At the level of the lateral edges 703A of the upper part 701A, the side panels 708 extend over more than half, or even more than two thirds, of the length of those lateral edges 703A, from the upper edge 704 of the non-pressurized door 701. In FIG. 7B the side panels even extend at the level of the lateral edges 703A over the whole length of the lateral edges 703A.

The extent of a side panel 708 along an axis parallel to the lengthwise direction of the lateral edge 703A decreases in the direction away from the upper edge 704 of the door 701. This extent may correspond to a dimension along (Oz), that is to say, a height, when the non-pressurized door 701 is open.

This reduction makes it possible to adapt the overall size of the side panel to the external profile of the aircraft, and to the space available inside the aircraft, when the non-pressurized door 701 is closed.

Moreover, each side panel, therefore, has a tapered profile preventing the side panels abutting against the lower part 701B of the non-pressurized door when the latter is closed.

In FIG. 7B each side panel 708 has a profile of circular arc shape.

It is not necessary for the lower part 701B of the non-pressurized door to be equipped with side panels. In fact, only an upper region of the non-pressurized door is liable to be on the axis of a flow of air produced by the engines.

These side panels 708 are of particular benefit when the passengers board or disembark from the aircraft when the engines are running, for example during an emergency evacuation, or simply during a phase of warming up the engines when the aircraft is on the ground.

Figure 8A:
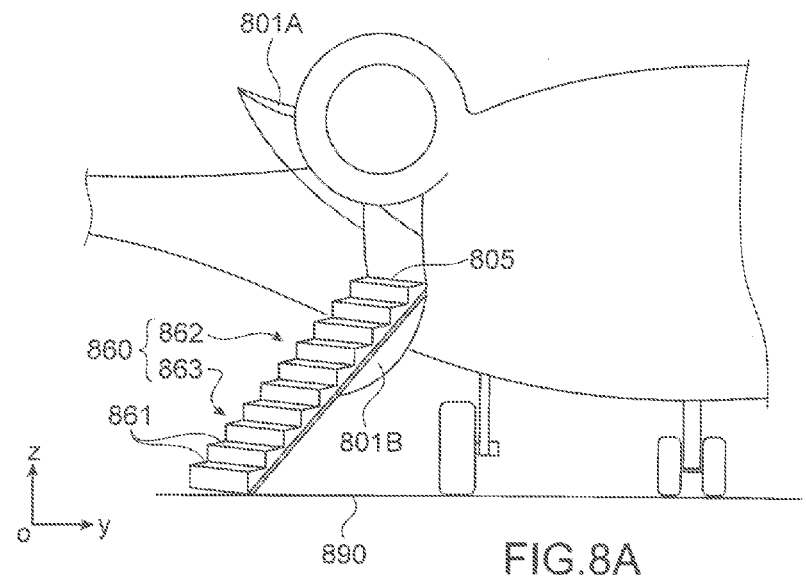
FIGS. 8A and 8B show part of an aircraft according to a seventh embodiment of the invention in which the non-pressurized door is provided with folding stairs, in perspective views with the aircraft supported on its undercarriage and on its underside.
Figure 8B:
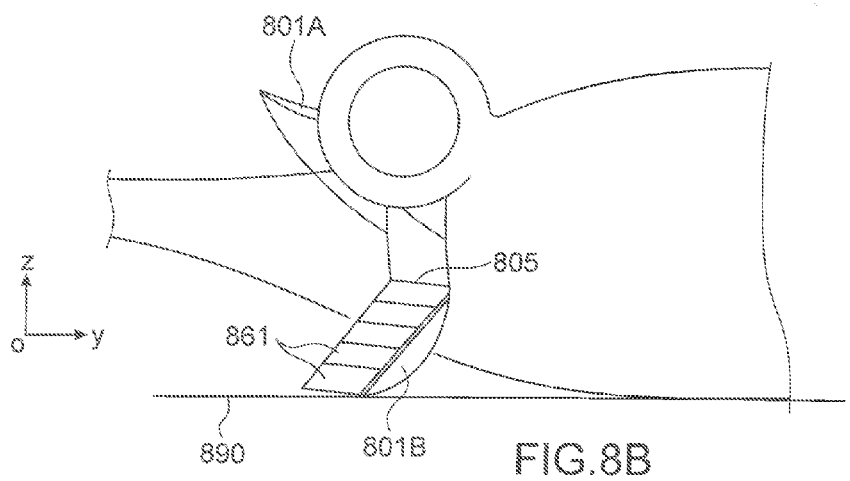

FIGS. 8A and 8B are perspective views of a part of a seventh embodiment of an aircraft according to the invention.

In FIGS. 8A and 8B the non-pressurized door is open.

In FIGS. 8A and 8B the non-pressurized door is provided with stairs 860 the steps 861 of which may optionally be foldable.

The stairs 860 allow passengers or ground personnel to embark and disembark.

The stairs 860 are inside the aircraft when the non-pressurized door is closed and deployed outside the aircraft when the non-pressurized door is open.

They may comprise a plurality of elements 862, 863 articulated to one another that can be unfolded to extend from the interior of the aircraft to the ground 890.

In the example shown in FIGS. 8A and 8B the stairs 860 are fastened to the lower part 801B of the non-pressurized door.

A first element 862 of the stairs has a first end fixed to the lower part 801B of the non-pressurized door, on the side of the inside of the aircraft, on the side opposite the lower edge 805 of the non-pressurized door.

The other end of this first element 862 is fastened to the interior of the aircraft, on the side of the lower edge 805. For example, this other end is fastened to a floor inside the aircraft or fastened to the lower part 801B of the non-pressurized door on the side of the lower edge 805.

Accordingly, the pivoting of the lower part 801B when opening the non-pressurized door leads to the deployment of this first element 862 outside the aircraft.

The first element 862 of the stairs is articulated to a second element 863 of the stairs.

The connection between the first element 862 and the second element 863 may be a pivot connection or a sliding connection oriented along the lengthwise axis of the lateral edges of the lower part 801B of the non-pressurized door.

In FIG. 8A there is a large distance along the axis (Oz) between the ground 890 and the lower edge 805 of the non-pressurized door because the aircraft is resting on its undercarriage. The stairs 860 are then completely deployed, the two elements 862 and 863 of the stairs extending one after the other.

In FIG. 8B there is a small distance along the axis (Oz) between the ground 890 and the lower edge 805 of the non-pressurized door because the aircraft is resting directly on its underside. FIG. 8B corresponds for example to an emergency landing situation. The stairs 860 are then deployed outside the aircraft but the two elements 862 and 863 of the stairs are folded, stacked one on the other.

The stairs 860 are moreover connected to means that are not shown for deploying or folding the steps 861 so that the stairs 860 can take the form of a simple belt, or ramp, when the steps are folded.

In an emergency evacuation situation, the steps 861 are folded to form a belt, or slide, facilitating evacuation of passengers.

The means for deploying or folding the steps 861 may include control means with an input connected to a sensor configured to identify an emergency evacuation situation and an output connected to an actuator, for example of pneumatic type, for actuating the deployment or the folding of the steps in response to a command formulated by the control means.

In FIG. 8A the stairs 860 are completely deployed and the steps 861 are deployed.

According to a variant that is not shown the stairs 860 are completely deployed and the steps 861 are folded.

In FIG. 8B the two elements 862 and 863 of the stairs are folded one on the other. In this position the steps 861 are folded.

The invention is not limited to the examples described above. For example, numerous variants of the cut-out of the pressurized and non-pressurized doors may be used without departing from the scope of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft of flying wing or blended wing body type comprising:
   for access to a pressurized housing of the aircraft, at least one pair of doors comprising a non-pressurized door in the trailing edge of the aircraft and a pressurized door on said pressurized housing,
   a distance between a geometric center of the pressurized door and a plane of symmetry of the aircraft being less than or equal to a distance between a geometric center of the non-pressurized door and said plane of symmetry; and
   the pressurized door being located either on a wall other than a rear wall of the pressurized housing, or upstream of a rear extremum point of said pressurized housing in an absence of any such rear wall.

2. The aircraft as claimed in claim 1, further comprising at least two turbine engines disposed at the rear of the aircraft and wherein the non-pressurized door is in the trailing edge not within a region of the trailing edge delimited by the engines of said at least two engines that are the farthest apart.

3. The aircraft as claimed in claim 1, wherein when the non-pressurized door is closed, its lateral edges each lie in a vertical plane inclined relative to the plane of symmetry of the aircraft.

4. The aircraft as claimed in claim 1, wherein when the pressurized door is closed, the pressurized door lies in a plane parallel to the plane of symmetry of the aircraft.

5. The aircraft as claimed in claim 1, wherein the non-pressurized door has an external surface with no discontinuity of slope relative to adjacent portions of the external surface of the rest of the aircraft.

6. The aircraft as claimed in claim 1, wherein the non-pressurized door has a shape that is integrated into the aerodynamic profile of the aircraft.

7. The aircraft as claimed in claim 1, wherein the non-pressurized door comprises an upper part and a lower part that are mounted to pivot toward the exterior of the aircraft, the upper part being mounted to pivot on a rotation element that extends along the upper edge of said door and the lower part being mounted to pivot on a rotation element that extends along the lower edge of said door.

8. The aircraft as claimed in claim 7, wherein the non-pressurized door is equipped with folding stairs attached to the lower part of said door and wherein the stairs include folding steps to transform the stairs into a ramp and vice versa.

9. The aircraft as claimed in claim 7, wherein lateral walls are attached to the upper part of the non-pressurized door, and are inside the aircraft when the non-pressurized door is closed, and outside the aircraft when the non-pressurized door is open.

* * * * *